March 17, 1959
D. W. KELBEL
2,877,668
VALVING CONTROLS
Filed Feb. 19, 1957
3 Sheets-Sheet 1
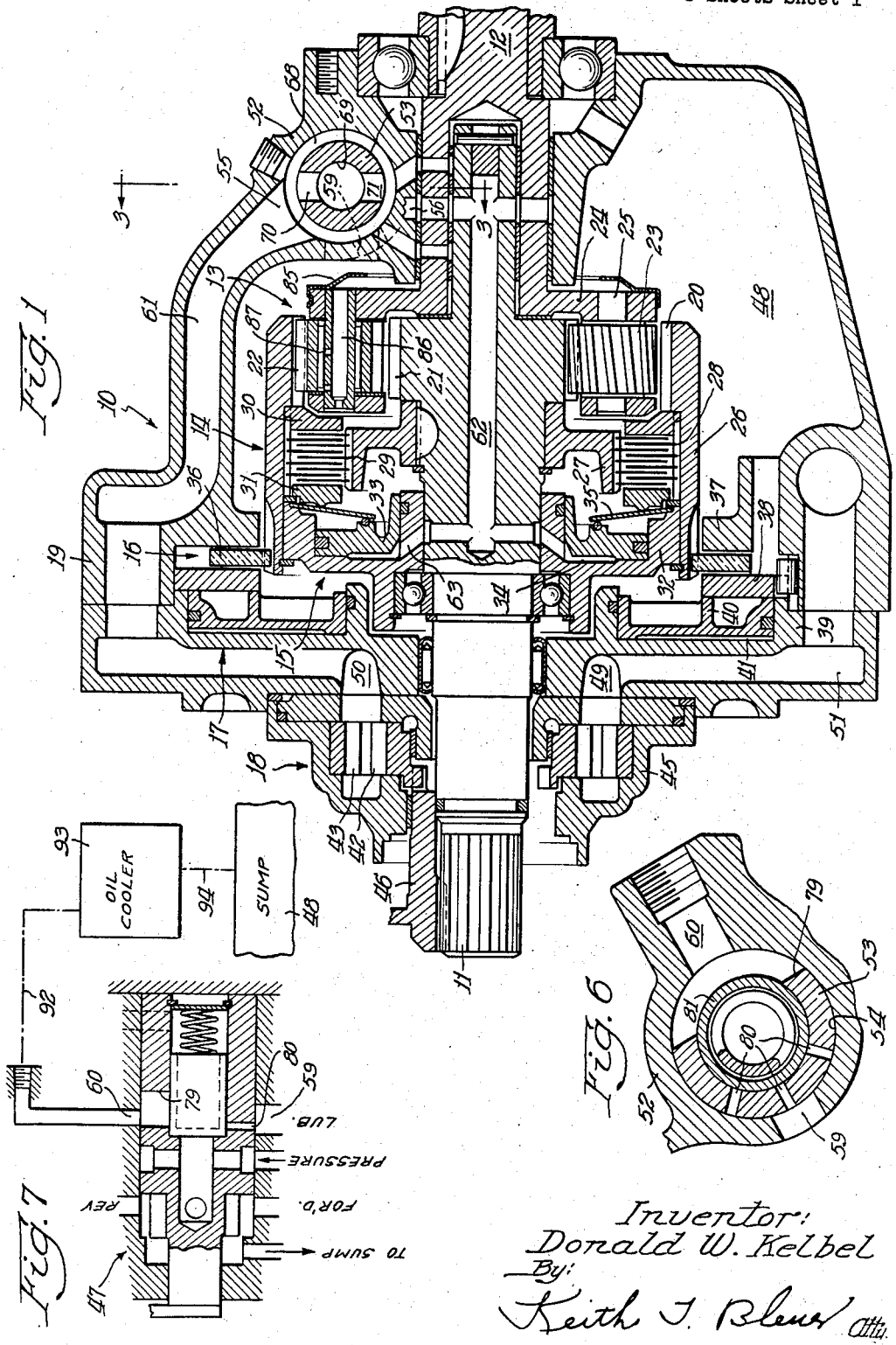
Inventor:
Donald W. Kelbel
By:
Keith J. Bleuer Atty.

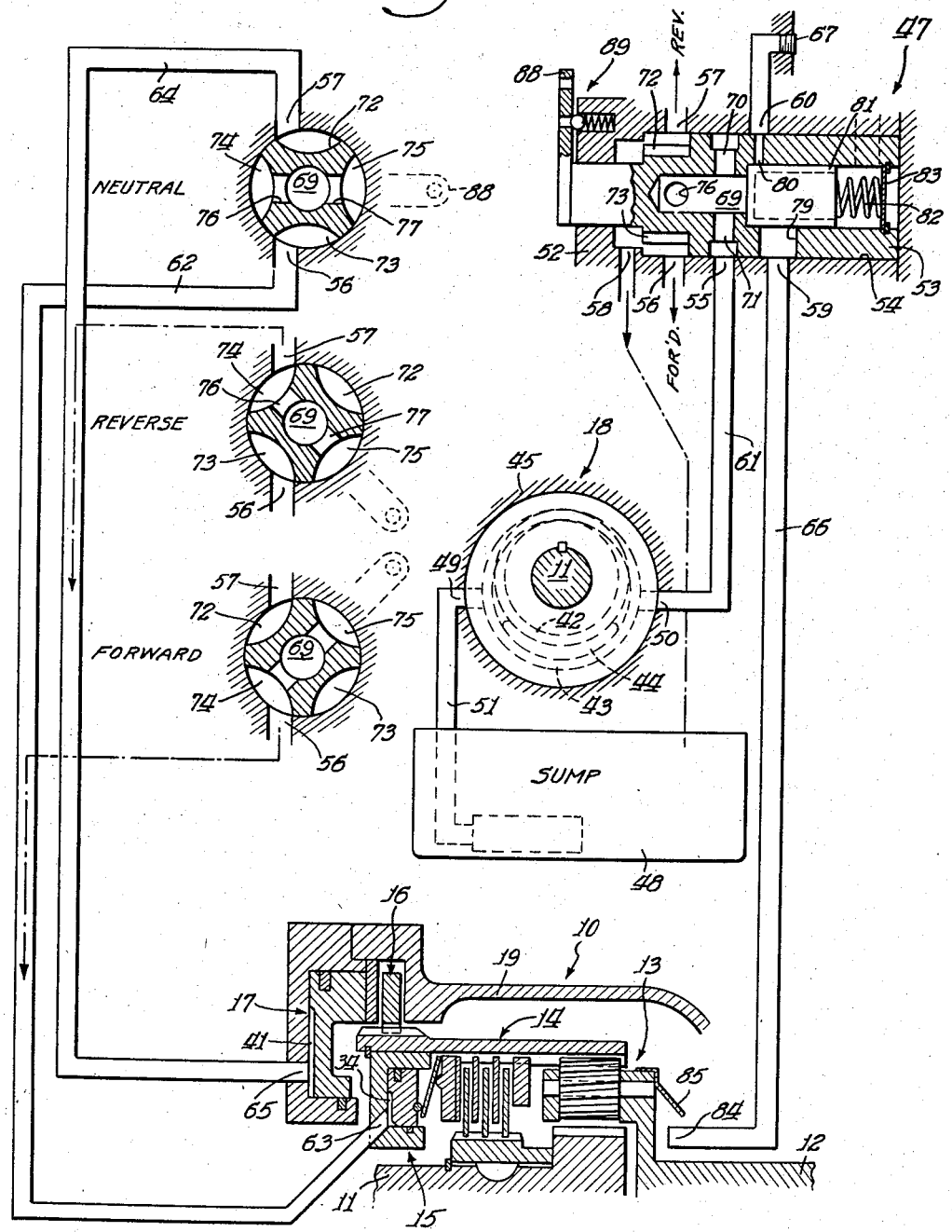

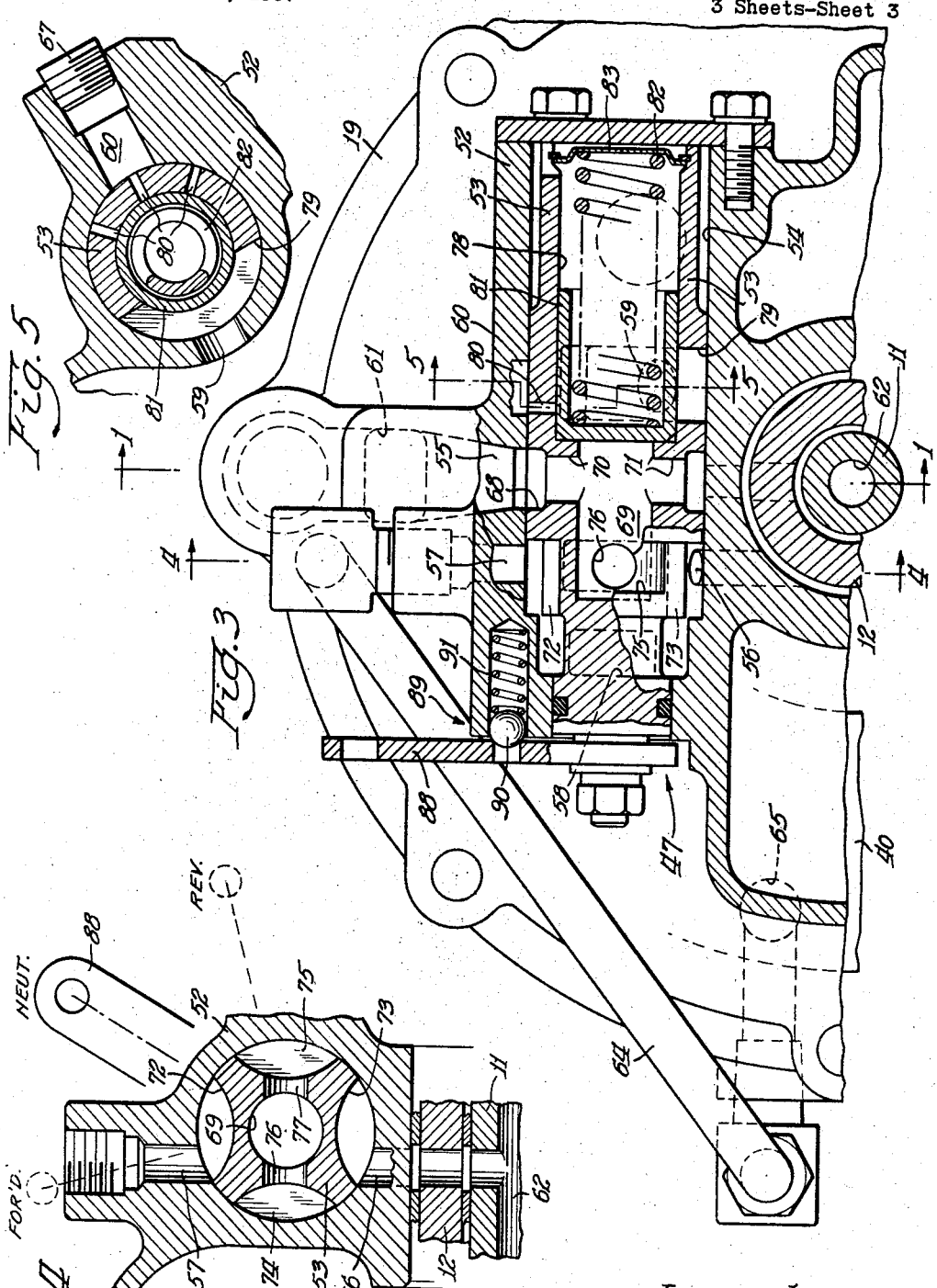

United States Patent Office 2,877,668
Patented Mar. 17, 1959

2,877,668
VALVING CONTROLS

Donald W. Kelbel, Muncie, Ind., assignor to Borg-Warner Corporation, Chicago, Ill., a corporation of Illinois Application February 19, 1957, Serial No. 641,125

4 Claims. (Cl. 74—788)

My invention relates to transmissions, and more particularly to controls of the hydraulic type for such transmissions.

It is an object of the present invention to provide improved control of the hydraulic type for completing a forward drive power train or a reverse drive power train through a transmission gearing unit.

More particularly, it is an object to provide hydraulic controls for a transmission mechanism including an improved rotary selector valve adapted to selectively condition the mechanism for forward drive condition, reverse drive condition, or neutral condition.

It is an additional object to provide improved hydraulic controls for a transmission which includes a rotary selector valve and a pressure relief valve disposed within said rotary selector valve.

It is another object to provide a modified embodiment of the hydraulic controls for a transmission which includes a fluid cooler for maintaining the hydraulic fluid at a desired operating temperature without resorting to a water cooled jacket for the transmission.

The invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

Fig. 1 is a longitudinal sectional view of a transmission mechanism adapted to employ control mechanism embodying the principles of the invention;

Fig. 2 is a diagrammatic illustration of the transmission and a hydraulic control system embodying the principles of the invention;

Fig. 3 is an enlarged sectional view, taken on line 3—3 of Fig. 1, of an improved rotary selector valve forming a part of the hydraulic control system illustrated in Fig. 2;

Figs. 4 and 5 are sectional views taken on lines 4—4 and 5—5, respectively, of Fig. 3;

Fig. 6 is a view of a modified construction of the rotary selector valve as illustrated along line 5—5 of Fig. 3; and Fig. 7 is a diagrammatic illustration of a modified form of the hydraulic control system embodying the principles of the invention.

Like characters of reference designate like parts in the several views.

Referring to the drawings, a transmission mechanism 10 is shown which is adapted to drive a propeller or output shaft. The transmission includes a drive shaft 11 and a driven shaft 12. The shaft 12 is coaxially disposed with the shaft 11, and the latter shaft is piloted into an enlarged end portion of the driven shaft 12. The drive shaft 11 is connected to a driving engine through suitable means (not shown), and the driven shaft 12 is connected to a propeller shaft through suitable means (not shown).

The transmission mechanism 10 as a whole comprises a duplex planetary gear set 13, a multiple plate direct drive clutch 14, a servomotor 15 for operating the clutch 14, a reverse drive brake 16, a servomotor 17 for operating the brake 16, and a fluid pump 18, all disposed within a casing 19.

The duplex planetary gear set 13 comprises a ring gear 20, a sun gear 21, a plurality of planet gears 22 and 23, and a planet gear carrier 24. The planet gears 22 and 23 are in mesh with each other and are free to rotate about studs 25 mounted in the carrier 24. The planet gears 22 are in mesh with the ring gear 20, and the planet gears 23 are in mesh with the sun gear 21. The ring gear 20 is formed in the interior of a drum 26; the sun gear 21 is formed on the drive shaft 11; and the planet gear carrier 24 is formed on an enlarged portion of the driven shaft 12.

The direct drive clutch 14 comprises the outer drum 26, an inner drum 27, plates 28 splined within the outer drum 26 and plates 29 interleaved with the plates 28 and splined to the inner drum 27, a fixed end plate 30, and an axially movable pressure plate 31 for pressing the plates 28 and 29 into engagement. The end plate 30 is splined within the outer drum 26, and the inner drum 27 is keyed to the drive shaft 11.

The servomotor 15 comprises an annular casing 32 journalled on the drive shaft 11 and supporting the drum 26 and an annular piston 33 slidably disposed within an annular cavity 34 formed in the casing 32. A Belleville type washer 35 is interposed between the piston 33 and the movable plate 31 of the clutch 14. The Belleville washer 35 is pivotally disposed with its outer periphery against the annular casing 32. The washer 35 is in contact with the piston 33 at a point near its inner periphery and in contact with the movable plate 31 of the clutch 14 at an intermediate point so that the body of the washer 35 functions as a lever in engaging the clutch 14.

The reverse drive brake 16 comprises a friction plate 36 splined to the drum 26, an annular casing portion 37 which is part of the casing 19 and forms a fixed end pressure plate, and an axially movable plate 38 for engaging the friction plate 36 between it and the fixed plate portion 37.

The servomotor 17 for operating the reverse drive brake 16 comprises an annular casing portion 39 formed in the casing 19 and an annular piston 40 slidably disposed within an annular cavity 41 formed in the casing portion 39. The annular piston 40 abuts directly against the plate 38 of the brake 16.

The fluid pump 18 comprises an inner gear 42, an outer gear 43 in mesh with and eccentrically disposed with respect to the gear 42, and a lunar shaped member 44 (see Fig. 2) fixedly disposed between the eccentric gears 42 and 43. The gears are rotatably disposed within a casing portion 45. The inner gear 42 is driven from the drive shaft 11 by means of an intermediate sleeve 46 which is splined to both the shaft 11 and the gear 42.

The transmission mechanism 10 may have a neutral condition, a direct forward drive condition, and a reverse drive condition.

Neutral condition is obtained when both the clutch 14 and the brake 16 are disengaged. In this condition, torque from the driving engine drives the drive shaft 11 which in turn drives the sun gear 21 of the gear set 13. Since there is no reaction member for the gear set 13, the forward rotation of the sun gear 21 causes the planet gears 22 and 23 to rotate about the studs 25 and drive the ring gear 20 freely in the forward direction. There is thus no driving connection between the drive shaft 11 and the driven shaft 12.

Forward drive condition is obtained when the clutch 14 is engaged and the brake 16 is disengaged. In this condition, the engaged clutch 14 locks together the ring gear 20 and the sun gear 21 so that the driving torque of the drive shaft 11 causes the gear set 13 to rotate forwardly as a unit carrying the planet carrier 24 and the driven shaft 12 forwardly at a one-to-one speed ratio with respect to the drive shaft 11.

Reverse drive is obtained when the brake 16 is engaged and the clutch 14 is disengaged. In this condition, the brake 16 holds the drum 26 and the ring gear 20 stationary so that the ring gear 20 serves as a reaction element for the gear set 13. The forward rotation of the drive shaft 11 and the sun gear 21 causes the planet gears 23 to rotate reversely about the studs 25. The reverse rotation of the planet gears 23 causes the planet gears 22 to rotate forwardly about studs 25. The stationary ring gear 20 in mesh with the planet gears 22 serves as a fixed reaction element, and as the planet gears 22 rotate forwardly about the studs 25 they walk around the interior of the ring gear 20 carrying the planet carrier 24 in retrograde motion with respect to the drive shaft 11.

The hydraulic control system (see Figs. 2, 3, 4 and 5) for the transmission mechanism 10 comprises the fluid pump 18, the servomotors 15 and 17, a rotary selector valve 47 and a sump 48.

The pump 18 has an inlet port 49 and an outlet port 50. The pump 18 draws fluid from the sump 48 through a passage 51 formed in the casing 19 and leading to the inlet port 49.

The rotary selector valve 47 comprises a casing portion 52 formed in the casing 19 and a valve core 53 rotatably disposed within a cylinder 54 formed in the casing portion 52. The casing portion 52 is formed with ports 55, 56, 57, 58, 59 and 60. A fluid passage 61 formed in the casing 19 connects the port 55 with the outlet port 50 of the pump 18. The port 56 is connected to a conduit 62 leading to a port 63 in the forward drive servomotor 15. The port 57 is connected to a conduit 64 leading to a port 65 in the reverse drive servomotor 17. The port 58 is a bleed port which allows fluid to bleed from the servomotors 15 and 17 and to be returned to the sump 48. The port 59 is connected to a conduit 66 which leads to the planetary gear set 13. The port 60 as seen in Figs. 2 and 5 is blocked by a plug 67.

The valve core 53 is formed with an annular groove 68, an axially extending central passage 69, two radially extending passages 70 and 71 connecting the axial passage 69 with the groove 68, two open end longitudinal grooves 72 and 73, two closed end grooves 74 and 75, two radially extending passages 76 and 77 connecting the grooves 74 and 75, respectively, with the axial passage 69, an enlarged axially extending cylinder 78 opening into the passage 69, an elongated slot 79 connecting the cylinder 78 with the port 59, and three radially extending ports 80 connecting the cylinder 78 with the port 60. A relief valve piston 81 is slidably disposed within the cylinder 78 and normally blocks an open end of the axial passage 69. The piston 81 is normally held in its illustrated position by a bias spring 82 interposed between the piston 81 and a retaining cap 83 affixed to one end of the valve core 53.

The annular groove 68 is in communication with the port 55 in the casing 52 and allows fluid to pass through the radial passages 70 and 71 into the axial passage 69. The closed end groove 74 is selectively placed in communication with either the port 56 or the port 57 by rotary movement of the valve core 53 for applying fluid pressure to the servomotor 15 and to the servomotor 17, respectively. Accumulated fluid in the servomotors 15 and 17 can be bled through the open end grooves 72 and 73 and the port 58 back to the transmission sump 48.

The conduit 66 is connected to the port 59 in the casing 52 and terminates at an open port 84 which is adjacent to an annular fluid collector ring 85 mounted on the planet gear carrier 24. Each of the studs 25 mounted in the planet carrier 24 is formed with an axially extending passage 86 opening into the collector ring 85. A plurality of radially extending ports 87 connect the passages 86 with the interior of the planet gears 22 and 23.

One end of the valve core 53 extends through the casing portion 52 and a lever arm 88 is attached thereto. A detent 89 comprising a ball 90 and a spring 91 is disposed in the casing 52 and yieldably holds the lever arm 88 in any one of its three selective positions corresponding to neutral, forward drive, or reverse drive.

The operation of the hydraulic control system for the transmission is as follows:

When the driving engine is running, the drive shaft 11 drives the inner gear 42 of the pump 18. Fluid is drawn from the sump 48 through the passage 51 and the inlet port 49 and is carried by the teeth of the gears 42 and 43 past the lunar shaped member 44 and discharged through the outlet port 50. The discharged fluid from the port 50 is transmitted through the passage 61 to the port 55 of the selector valve 47. The annular groove 68 allows passage of the fluid through the radially extending passages 70 and 71 into the axial passage 69. With the selector valve 47 set in the neutral position, the grooves 74 and 75 are blocked by the casing 52 and fluid is prevented from passing to either of the servomotors 15 or 17. The fluid pressure developed by the pump 18, in this condition, acts against the relief valve piston 81 and causes it to move to the right against the action of the bias spring 82. As the piston 81 moves to the right, the slot 79 is opened and the fluid is discharged through the port 59 into the conduit 66. The axial distance that the piston 81 moves to the right is a direct function of the fluid pressure applied against it. The greater axial distance that the piston 81 is moved, the larger is the opening through the slot 79 and the greater is the amount of fluid discharged through the slot 79. The relief valve piston 81 thus functions as a fluid pressure regulator for limiting the pressure developed by the pump 18 to a predetermined maximum.

When the selector valve 47 is set in its forward drive position, the groove 74 of the valve core 53 is placed in communication with the port 56. Fluid under pressure flows as previously described to the axial passage 69 and flows from the passage 69 through the port 56, the conduit 62, and the port 63 into the forward drive servomotor 15. The fluid pressure applied against the annular piston 33 causes it to move to the right so as to engage the direct drive clutch 14 and complete the direct drive. When the groove 74 is in communication with the port 56, the open end groove 72 is in communication with the port 57 and any accumulated fluid within the servomotor 17 is allowed to drain through the conduit 64, the port 57, and the port 58 into the transmission sump 48. The relief valve piston 81 continues to function as a fluid pressure regulator, and the fluid discharged through the slot 79 and the conduit 66 into the collector ring 85 is caused to flow, under the influence of centrifugal force through the axial passages 86 and the radial ports 87 so as to lubricate the planet gears 22 and 23.

When the selector valve 47 is set in its reverse drive position, the port 74 is in communication with the port 57, and fluid under pressure flows from the axial passage 69 through the port 57, the conduit 64, and the port 65 into the reverse drive servomotor 17. The fluid pressure acting against the piston 40 causes it to move to the right so as to engage the brake 16 to complete the reverse drive. With the selector valve 47 set in position for effectuating reverse drive, the open end groove 73 is in communication with the port 56, and any accumulated fluid within the servomotor 15 is allowed to drain through the conduit 62 and the ports 56 and 58 into the sump 48.

The selector valve 47 with parts of it being differently arranged and with different connections being made to it is shown in Figs. 6 and 7. The valve core 53 is shown in these figures rotated 180° from its Fig. 3 position, and the blocking plug 67 is removed. A conduit 92 is connected between the port 60 and a fluid cooler 93, and a conduit 94 is connected between the fluid cooler 93 and the sump 48.

With the valve core 53 in its position, shown in Figs. 6 and 7, fluid pressure can be communicated from the pump 18 to the servomotors 15 and 17 as previously described, except that the closed end groove 75 is now selectively placed in communication with the port 56 for completing forward drive and with the port 57 for completing reverse drive. Accumulated fluid is drained from the servomotor 15 through the open end groove 72 instead of 73 and from the servomotor 17 through the open end groove 73 instead of 72. The relief valve piston 81 continues to function as a pressure regulator as before, except that a relatively greater amount of fluid passes through the elongated slot 79 to the fluid cooler 73 than passes through the relatively smaller ports 80 for lubricating the planetary gear set 13. This modified construction has the advantage of maintaining the hydraulic fluid at a desired operating temperature without resorting to a water cooled jacket or the equivalent surrounding the transmission.

It is to be understood that my invention is not to be limited to the specific construction and arrangements shown and described, except only insofar as the claims may be so limited, as it will be understood to those skilled in the art, that changes may be made without departing from the principles of the invention.

I claim:

1. In transmission mechanism; the combination of a drive shaft; a driven shaft; means including a fluid pressure actuated clutch for providing a forward drive power train; means including a fluid pressure actuated brake for providing a reverse drive power train; a source of fluid pressure; a rotary valve having a neutral position in which said pressure source is blocked with respect to said clutch and said brake and having forward drive position on one side of said neutral position for connecting said pressure source with said clutch and having a reverse drive position on the other side of said neutral position for connecting said pressure source with said brake for completing the reverse drive power train; said rotary valve comprising a rotatable sleeve-like core having a manually operable lever attached thereto and having a relief valve piston slidably disposed within a cylindrical cavity formed in said rotatable core; said core also being formed with a discharge port therein which is normally blocked by said relief valve piston; said piston being in communication with said source of fluid pressure and adapted to be moved under the influence of fluid pressure so as to open said discharge port and allow release of fluid pressure through said port and thereby regulate the fluid pressure supplied by said source for all positions of the said rotatable core.

2. In transmission mechanism; the combination of a drive shaft; a driven shaft; planetary gearing having driving, drive receiving, and driven elements; said drive shaft being connected with said driving element and said driven shaft being connected with said driven element; a fluid pressure actuated clutch adapted to lock together two of said elements of said planetary gearing for completing the forward drive power train between said shafts; a fluid pressure actuated brake for holding one of said elements of said gear set and thereby completing a reverse drive power train between said shafts; a source of fluid pressure; a rotary valve having a forward drive position for connecting said pressure source with said clutch and having a reverse drive position for connecting said pressure source with said brake; said rotary valve comprising a rotatable core having a relief valve piston slidably disposed within a cylindrical cavity formed in said core; said core also being formed with a plurality of discharge ports which are normally blocked by said piston; and a fluid cooling system connected with one of said discharge ports; said piston being in communication with said source of fluid pressure and adapted to be moved under the influence of fluid pressure so as to open said discharge ports and allow fluid to pass therethrough into said fluid cooling system, and fluid discharged through another of said ports being effective to lubricate the transmission mechanism.

3. In transmission mechanism; the combination of a drive shaft; a driven shaft; a duplex planetary gear set having a sun gear, a ring gear, a plurality of planet gears, and a planet gear carrier; said drive shaft being connected with said sun gear and said driven shaft being connected with said planet gear carrier; a fluid pressure actuated clutch adapted to lock together said sun gear and said ring gear and thereby lock up the entire planetary gear set so as to complete a forward drive power train between said shafts; a fluid pressure actuated brake adapted to hold the ring gear of said planetary gear set and thereby serve as a reaction element for said gear set and complete a reverse drive power train between said shafts; a source of fluid pressure; a rotary selector valve comprising a casing portion and a rotatable core; a fluid cooler; and a lubrication conduit; said casing portion being formed with a first port connected to said source of fluid pressure, a second port connected to said clutch, a third port connected to said brake, a fourth port connected to said fluid cooler, and a fifth port connected to said lubrication conduit; said rotatable core being formed with an axially extending central passage, a radially extending passage connecting said axial passage with said first port, a second radially extending passage for selectively communicating fluid pressure from said axial passage to said second and third ports; said rotatable core also being formed with a relief valve piston adapted to be moved axially under the influence of fluid pressure and allow the discharge of fluid through said fourth port into said fluid cooler and through said fifth port into said lubrication conduit for thereby lubricating the planetary gearing.

4. In a transmission mechanism, the combination of a drive shaft; a driven shaft; gearing interconnecting said shafts; a first fluid pressure actuated device operable on said gearing to establish a forward drive power train between said shafts; a second fluid pressure actuated device operable on said gearing for establishing a reverse drive power train between said shafts; a source of fluid pressure; a rotary valve having a forward drive position in which said pressure source is connected with said first fluid pressure actuated device and having a reverse drive position in which said pressure source is connected with said second fluid pressure actuated device, said rotary valve comprising a rotatable sleeve-like core having a relief valve piston slidably disposed within a cylindrical cavity formed in said core, said core also being formed with a discharge port which is normally blocked by said piston, said discharge port being in communication with said gearing, and said piston being in communication with said source of fluid pressure and adapted to be moved under the influence of fluid pressure so as to open said discharge port and allow fluid to pass therethrough for lubricating said gearing.

References Cited in the file of this patent

UNITED STATES PATENTS

| | | |
|---|---|---|
| 2,672,769 | Gerst | Mar. 23, 1954 |
| 2,688,298 | Long | Sept. 7, 1954 |
| 2,732,852 | Lauck | Jan. 31, 1956 |